(12) United States Patent
Fliegner et al.

(10) Patent No.: US 9,644,984 B2
(45) Date of Patent: May 9, 2017

(54) OPERATING DEVICE FOR A MOTOR VEHICLE

(75) Inventors: Jens Fliegner, Wahrenholz (DE); Andreas Ebert, Braunschweig (DE)

(73) Assignee: VOLKSWAGEN AG, Wolfsburg (DE)

( * ) Notice: Subject to any disclaimer, the term of this patent is extended or adjusted under 35 U.S.C. 154(b) by 1631 days.

(21) Appl. No.: 11/661,588

(22) PCT Filed: Aug. 6, 2005

(86) PCT No.: PCT/EP2005/008634
§ 371 (c)(1),
(2), (4) Date: Feb. 26, 2007

(87) PCT Pub. No.: WO2006/021319
PCT Pub. Date: Mar. 2, 2006

(65) Prior Publication Data
US 2008/0024457 A1    Jan. 31, 2008

(30) Foreign Application Priority Data
Aug. 24, 2004  (DE) .................... 10 2004 040 886

(51) Int. Cl.
*G06F 1/00* (2006.01)
*G01C 21/36* (2006.01)
(52) U.S. Cl.
CPC ................. *G01C 21/3652* (2013.01)
(58) Field of Classification Search
CPC ............................. G06F 3/012; G06F 3/0317
USPC ........................................................ 345/173
See application file for complete search history.

(56) References Cited

U.S. PATENT DOCUMENTS

| | | | | |
|---|---|---|---|---|
| 4,950,205 A | * | 8/1990 | Umeyama | 464/68.91 |
| 5,620,068 A | * | 4/1997 | Garnjost et al. | 188/378 |
| 5,625,576 A | | 4/1997 | Massie et al. | |
| 5,726,968 A | * | 3/1998 | Blankers et al. | 720/688 |
| 5,768,883 A | * | 6/1998 | Mayer | 60/773 |

(Continued)

FOREIGN PATENT DOCUMENTS

| | | |
|---|---|---|
| DE | 197 31 285 | 1/1999 |
| DE | 201 02 197 | 7/2001 |

(Continued)

OTHER PUBLICATIONS

International Search Report, PCT International Patent Application No. PCT/EP2005/008634, dated Nov. 11, 2005.

(Continued)

*Primary Examiner* — Michael Faragalla
(74) *Attorney, Agent, or Firm* — Kenyon & Kenyon LLP

(57) ABSTRACT

An operating device is for operating a computing device, e.g., an operating device is for operating a computing device for controlling functions in a motor vehicle, the operating device including a display for optically displaying information, a touch screen situated above the display, for the input of commands by touching the touch screen and/or by pressing on the touch screen, and an actuator for setting the touch screen in motion, and the operating device having an internal control system for controlling the actuator for setting in motion the touch screen in response to a touching of the touch screen and/or in response to a pressing on the touch screen, in an area of the touch screen that is provided for haptic feedback.

13 Claims, 4 Drawing Sheets

(56) References Cited

U.S. PATENT DOCUMENTS

| | | | |
|---|---|---|---|
| 5,871,008 A * | 2/1999 | Poon et al. | 128/202.12 |
| 5,883,478 A * | 3/1999 | Thesling | 318/119 |
| 5,898,366 A * | 4/1999 | Brown et al. | 340/457.1 |
| 5,927,196 A * | 7/1999 | Murray | 101/219 |
| 5,927,678 A * | 7/1999 | Parr | 248/559 |
| 5,956,016 A | 9/1999 | Kuenzner et al. | |
| 6,032,558 A * | 3/2000 | Michler | 83/74 |
| 6,076,298 A * | 6/2000 | Teel | 43/54.1 |
| 6,131,097 A | 10/2000 | Peurach et al. | |
| 6,147,422 A | 11/2000 | Delson et al. | |
| 6,252,336 B1 * | 6/2001 | Hall | 310/339 |
| 6,290,037 B1 * | 9/2001 | Williams et al. | 188/379 |
| 6,429,846 B2 | 8/2002 | Rosenberg et al. | |
| 6,439,282 B1 * | 8/2002 | Kimura et al. | 152/158 |
| 6,624,653 B1 * | 9/2003 | Cram | 324/750.05 |
| 6,650,345 B1 * | 11/2003 | Saito et al. | 345/173 |
| 6,666,471 B2 * | 12/2003 | Gatel | 280/602 |
| 6,722,740 B2 * | 4/2004 | Imayou et al. | 297/408 |
| 6,729,610 B2 * | 5/2004 | Constantinescu | 267/81 |
| 6,741,525 B2 * | 5/2004 | Kurita et al. | 369/13.12 |
| 6,772,785 B2 * | 8/2004 | Jackson | 137/489 |
| 6,775,893 B2 * | 8/2004 | Constantinescu | 29/281.5 |
| 6,791,345 B2 * | 9/2004 | Maruyama et al. | 324/754.08 |
| 6,819,990 B2 * | 11/2004 | Ichinose | 701/36 |
| 6,829,955 B1 * | 12/2004 | Mahgerefteh | 73/865.5 |
| 6,950,569 B2 * | 9/2005 | Smith | 385/16 |
| 7,026,599 B2 * | 4/2006 | Gombert | 250/221 |
| 7,322,657 B2 * | 1/2008 | Matsuhashi | 303/113.4 |
| 8,012,180 B2 * | 9/2011 | Studer et al. | 606/257 |
| 8,066,309 B2 * | 11/2011 | Bartos | 292/337 |
| 8,085,137 B2 * | 12/2011 | Weiershausen | 340/425.5 |
| 2001/0022256 A1 * | 9/2001 | Misaji et al. | 188/378 |
| 2001/0028345 A1 * | 10/2001 | Natsuyama et al. | 345/179 |
| 2002/0033795 A1 * | 3/2002 | Shahoian et al. | 345/156 |
| 2002/0149561 A1 * | 10/2002 | Fukumoto et al. | 345/156 |
| 2003/0058265 A1 * | 3/2003 | Robinson et al. | 345/701 |
| 2003/0063073 A1 * | 4/2003 | Geaghan | G06F 3/0416 345/173 |
| 2003/0076298 A1 * | 4/2003 | Rosenberg | 345/156 |
| 2003/0222492 A1 * | 12/2003 | Nemoto et al. | 297/410 |
| 2004/0091711 A1 * | 5/2004 | Mukasa et al. | 428/408 |
| 2004/0134089 A1 * | 7/2004 | Fleissner | 34/114 |
| 2004/0174310 A1 * | 9/2004 | Silva | 343/711 |
| 2004/0181381 A1 * | 9/2004 | Matsuhashi | 703/7 |
| 2004/0200861 A1 * | 10/2004 | Ward et al. | 222/321.6 |
| 2004/0203492 A1 * | 10/2004 | Chen | 455/90.1 |
| 2004/0226590 A1 * | 11/2004 | Ko | 135/22 |
| 2004/0246014 A1 * | 12/2004 | Goto | 324/761 |
| 2005/0056979 A1 * | 3/2005 | Studer et al. | 267/118 |
| 2005/0099252 A1 * | 5/2005 | Isobe et al. | 335/78 |
| 2005/0115531 A1 * | 6/2005 | Tsuji | 123/90.27 |
| 2005/0122317 A1 * | 6/2005 | Schaaf et al. | 345/173 |
| 2005/0162496 A1 * | 7/2005 | Elenes | 347/108 |
| 2005/0173233 A1 * | 8/2005 | Kaelberer | 200/181 |
| 2005/0194394 A1 * | 9/2005 | Ueda et al. | 221/4 |
| 2005/0212633 A1 * | 9/2005 | Kraus et al. | 335/229 |
| 2005/0217964 A1 * | 10/2005 | Asahina et al. | 192/109 F |
| 2005/0225539 A1 * | 10/2005 | Prados | 345/173 |
| 2005/0238515 A1 * | 10/2005 | Kent | 417/476 |
| 2005/0284646 A1 * | 12/2005 | Bacila | 173/162.2 |
| 2005/0286961 A1 * | 12/2005 | Kortum | 400/715 |
| 2006/0055241 A1 * | 3/2006 | Mochizuki et al. | 303/155 |
| 2006/0119589 A1 * | 6/2006 | Rosenberg et al. | 345/173 |
| 2011/0275027 A1 * | 11/2011 | Lint et al. | 433/101 |

FOREIGN PATENT DOCUMENTS

| | | |
|---|---|---|
| DE | 201 80 024 | 1/2002 |
| WO | WO 01/54109 | 7/2001 |
| WO | WO 02/073587 | 9/2002 |
| WO | WO 03/038800 | 5/2003 |
| WO | WO 03/041046 | 5/2003 |

OTHER PUBLICATIONS

Written Opinion of the International Search Authority, PCT International Patent Application No. PCT/EP2005/008634, dated Nov. 11, 2005 (translation provided).

* cited by examiner

OPERATING DEVICE FOR A MOTOR VEHICLE

FIELD OF THE INVENTION

The present invention relates to an operating device for operating a computing device, e.g., an operating device for operating a computing device for controlling functions in a motor vehicle, the operating device including a display for optically displaying information, a touch screen, situated above the display, for the input of commands by touching the touch screen and/or by pressing on the touch screen, and an actuator for setting the touch screen in motion.

BACKGROUND INFORMATION

A system made up of a computing device, a display, a touch screen and an actuator for setting the touch screen in motion is described in U.S. Patent Application Publication No. 2003/0058265.

A touch screen is also described in German Published Utility Model Patent No. 201 02 197, for instance. German Published Utility Model Patent No. 201 02 197 describes a touch screen for visually representing electronic signals and for inputting signs and symbols by touching the screen for confirmation purposes. It includes a functional plane for visual representation and keystroke input and a higher-level protective plane corresponding to it that is deformable at certain points. In this context, when certain points of the functional plane are selected by touching contact across the protective plane, at least one confirmation signal is generated so as to be perceptible to the user's sense of touch (haptic stimulus), at the position of the point of contact in the deformed protective plane, and the confirmation signal for the sense of touch (haptic stimulus) is generated by vibration elements eccentrically positioned within and/or underneath the functional plane. In addition, in the touch screen described in German Published Utility Model Patent No. 201 02 197, the generated vibrations are transmitted from the functional plane to the protective plane as the result of direct contacting of the two planes and/or via the edge regions of the planes by rigid or elastic connecting elements.

Details concerning touch screens may be gathered, for example, from the Internet page www.3m.com/3mtouchsystems/.

In German Published Utility Model Patent No. 201 80 024 and PCT International Published Patent Application No. WO 01/54109, a touch-sensitive control featuring haptic feedback for inputting signals into a computer and for outputting forces to a user of the touch-sensitive control is described for haptic feedback, the touch-sensitive control having a touch-sensitive input device which has a virtually planar touch-screen surface that is operated such that, on the basis of a position on the touch-screen surface touched by a user, a positional signal is input into a processor of the computer, the positional signal reproducing the position in two dimensions. The touch-sensitive control described in PCT International Published Patent Application No. WO 01/54109 also has at least one actuator connected to the touch-screen input device, the actuator outputting a force to the touch-screen input device in order to provide the user touching the touch-screen surface with a haptic sensation, the actuator outputting the force directly to the touch-screen input device on the basis of force information output by the processor.

Haptic feedback is also described in U.S. Pat. No. 6,429, 846, PCT International Published Patent Application No. WO 03/038800, PCT International Published Patent Application No. WO 02/073587 and PCT International Published Patent Application No. WO 03/41046.

German Published Patent Application No. 197 31 285 describes an operating element for a device having a plurality of selectable menus, functions, and/or functional values, which has a surface that is understandable to the user and via which the selection is able to be made by locally moving or touching the operating surface. The form of the surface can be altered to conform with the selected and/or selectable menu, function and/or functional value.

SUMMARY

Example embodiments of the present invention provide an operating device for operating a computing device, e.g., an operating device for operating a computing device for controlling functions in a motor vehicle.

According to an example embodiment of the present invention, in an operating device for operating a computing device, e.g., by an operating device for operating a computing device for controlling functions in a motor vehicle, the operating device includes a display for optically displaying information, a touch screen, situated above the display, for the input of commands by touching the touch screen and/or by pressing on the touch screen, and an actuator for setting the touch screen in motion, and the operating device having an internal control for controlling the actuator for setting in motion the touch screen when touching the touch screen and/or when pressing on the touch screen in an area of the touch screen that is provided for haptic feedback. In this manner, a rapid haptic feedback is achieved that is particularly suitable for operating motor vehicles.

The actuator may be able to be activated for moving the touch screen using the internal control in a different manner from generating different haptic feedbacks.

The operating device may include an interface for reading in geographical information for the definition of a point and/or a surface on the touch screen and an output instruction assigned to the geographical information, to state whether, in response to touching the touch screen and/or pressing on the touch screen at a location corresponding to the geographical details, a message concerning the touching of the touch screen and/or the pressing on the touch screen is to be output by the operating device.

With the aid of the interface, haptic information assigned to the geographical details for stating the type of haptic reaction in response to touching the touch screen and/or to pressing on the touch screen may be able to be transmitted to the operating device.

The display may be able to be controlled using the internal control. This means, in particular, that the image construction on the display takes place using the internal control.

According to an example embodiment of the present invention, in a motor vehicle having an operating device including the aforementioned features, using the operating device, a control unit or a control system for controlling an air conditioning system of the motor vehicle may be operable, a control unit or a control system for controlling a navigation system of the motor vehicle may be operable, a control unit or a control system for controlling an infotainment system of the motor vehicle may be operable and/or a control unit or a control system for controlling a telephone in the motor vehicle may be operable. Such control units may be computing devices in the aforementioned sense, in this context.

According to an example embodiment of the present invention, in a motor vehicle having an operating device including the aforementioned features, using the operating device, an air conditioning system of the motor vehicle, a navigation system of the motor vehicle, an infotainment system of the motor vehicle and/or a telephone in the motor vehicle may be operable.

According to an example embodiment of the present invention, in an operating device, e.g., an operating device for a motor vehicle, the operating device includes a display for optically displaying information, a touch screen, situated above the display, for the input of commands by touching the touch screen and/or by pressing on the touch screen, and an actuator for setting the touch screen in motion, and the operating device having an interface for reading in geographical information for the definition of a point and/or a surface on the touch screen and an output instruction assigned to the geographical information, to state whether, in response to touching the touch screen and/or pressing on the touch screen at a location corresponding to the geographical details, a message concerning the touching of the touch screen and/or the pressing on the touch screen is to be output by the operating device.

With the aid of the interface, haptic information assigned to the geographical details for stating the type of haptic reaction in response to touching the touch screen and/or to pressing on the touch screen may be able to be transmitted to the operating device.

A motor vehicle may include, e.g., a land vehicle that may be used individually in road traffic. Motor vehicles are specifically not restricted to land vehicles having an internal combustion engine.

Further aspects and details of exemplary embodiments of the present invention are described in more detail below with reference to the appended Figures.

DETAILED DESCRIPTION

Figure 1:
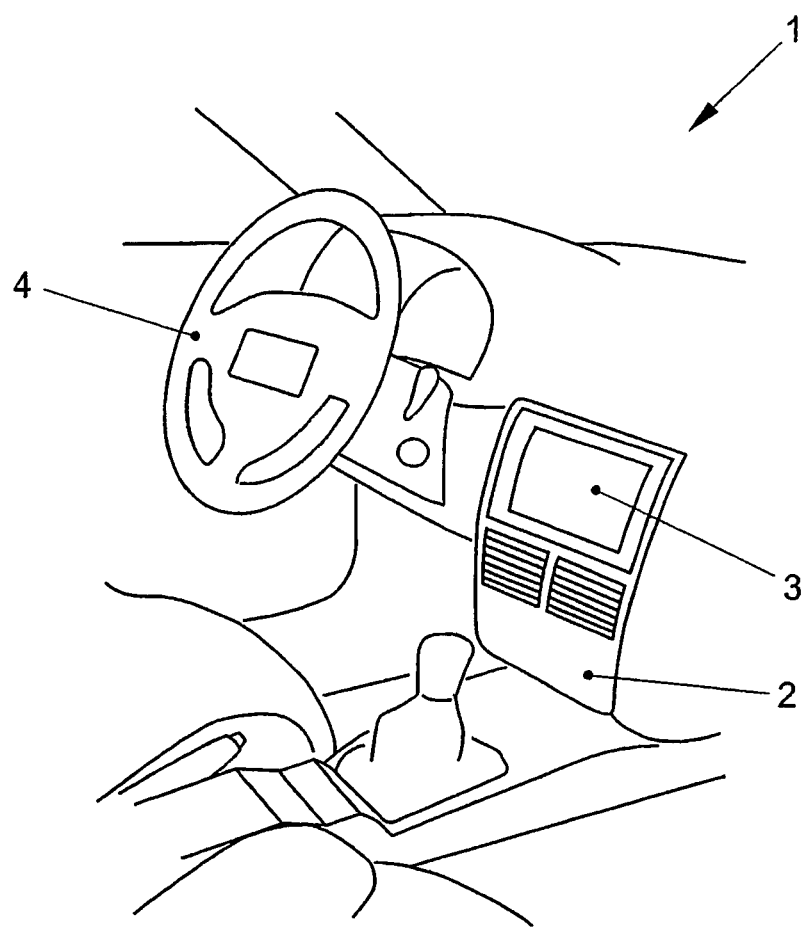
FIG. 1 is an internal view of an exemplary embodiment of a motor vehicle.

FIG. 1 illustrates a motor vehicle 1 in an internal view. Motor vehicle 1 includes an operating device 3, situated in a center console, for operating a computing device for controlling functions of the motor vehicle 1, the operating device including a display for optically displaying information, a touch screen, situated above the display, for the input of commands by touching the touch screen and/or by pressing on the touch screen, and an actuator for setting the touch screen in motion. Operating device 3, instead of being situated in center console 2, may also be positioned in steering wheel 4. One operating device may also be provided in each of center console 2 and steering wheel 4. Other situations for such an operating device are also possible.

Figure 2:
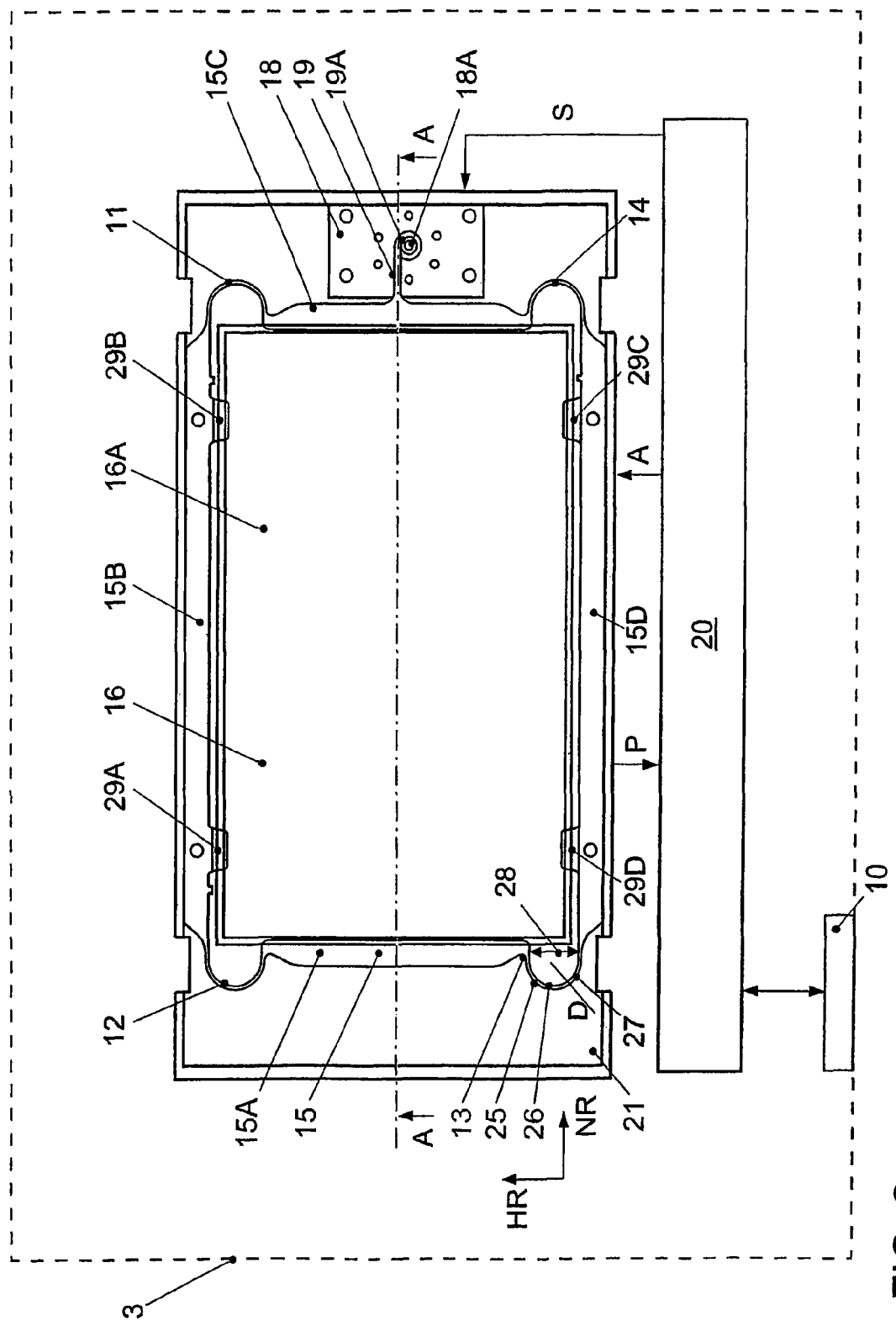
FIG. 2 illustrates an exemplary embodiment of an operating device.

FIG. 2 illustrates operating device 3 in an exemplary embodiment in a top view, as it would be suitable, e.g., for use in a motor vehicle.

Figure 3:
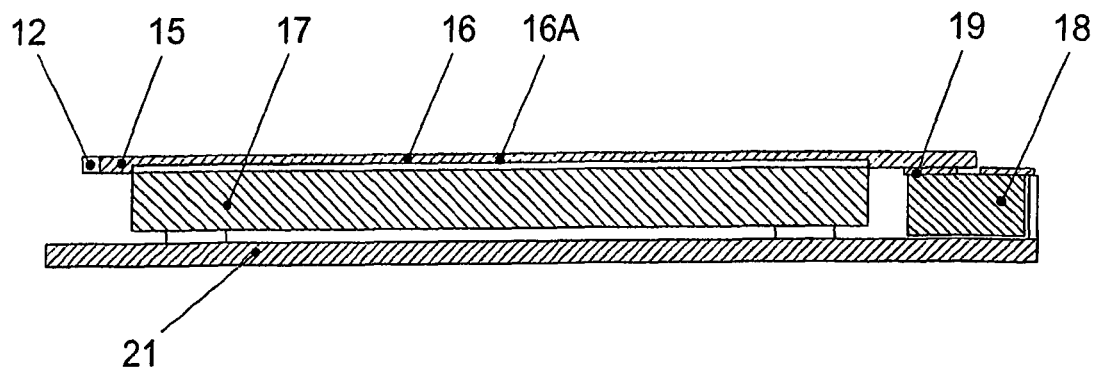
FIG. 3 is a cross-sectional view of the operating device illustrated in FIG. 2 taken along line A-A.

FIG. 3 is a cross-sectional view of operating device 3 taken along line A-A illustrated in FIG. 2.

Operating device 3 has a transparent touch screen 16 that is situated above a display 17, having an operating surface 16A. Display 17 is connected to a reference element 21 via mounting supports 29A, 29B, 29C and 29D. Reference element 21 may, for instance, be part of center console 2 or steering wheel 4.

Touch screen 16 may include a force sensor (or similar or other sensor) with whose aid a user-exerted pressure on touch screen 16 may be ascertained. In this manner, using touch screen 16, it is possible to distinguish the touching of touch screen 16 by a user from an intentional operation by pressing on touch screen 16. Thus, exerting pressure on touch screen 16, at a location indicated as an operating element, results in an operation of touch screen 16, but a simple touching of touch screen 16 by a user, in a location shown as an operating element, does not. Such an arrangement may be suitable for use in motor vehicles.

Touch screen 16 is supported by a frame 15. Frame 15 has four U-shaped springs 11, 12, 13, 14, which are interconnected by connecting elements 15A, 15B, 15C and 15D. Frame 15 is a casting made of plastic, i.e., U-shaped springs 11, 12, 13, 14 are cast jointly with connecting elements 15A, 15B, 15C and 15D from one piece of plastic. The frame is bonded to touch screen 16 at connecting elements 15A and 15C. In an alternative or additional arrangement, touch screen 16 is supported in the frame by prestressing U-shaped springs 11, 12, 13, 14.

Frame 15 has a (flexible) connecting piece 19, which is joined to connecting element 15C. Connecting piece 19 has a curved region 19A, which surrounds an eccentric driveshaft neck 18A of an actuator 18 arranged as an electric motor. The rotary motion of actuator 18 is converted into a linear motion. Actuator 18 is configured as a direct current (brush) motor. However, other arrangements in conjunction with a different type of connection to frame 15, such as piezo actuators or so-called voice coils, may be used as well.

U-shaped springs 11, 12, 13, 14 each have two spring arms 25 and 27, an opening 28 disposed between the two spring arms 25 and 27, and a connection point 26 at which the two spring arms 25 and 27 are joined. Substantially in parallel to opening 28, U-shaped springs 11, 12, 13, 14 have a main-spring constant and, substantially perpendicular to opening 28, they have a secondary-spring constant, the secondary-spring constant being at least four times the main-spring constant. In the present exemplary embodiment, the main spring constant refers to a direction denoted by main direction HR in FIG. 3, and the secondary spring constant relates to a direction denoted as secondary direction NR in FIG. 3. Main direction HR and secondary direction NR are orthogonal with respect to each other, but extend parallel to control panel 16A.

U-shaped springs 11, 12, 13, 14 have a thickness D of 0.5 mm to 2 mm, and of 0.8 mm in the exemplary embodiment illustrated. The width of opening 28 amounts to between 5 mm and 30 mm. The specific width of opening 28 is selected as a function of the material such that a desired main-spring constant is obtained. The main-spring constant is adapted to a mass of touch screen 16 such that touch screen 16, in combination with U-shaped springs 11, 12, 13, 14, has a mechanical natural frequency of 5 Hz to 150 Hz, e.g., a natural frequency of 30 Hz to 75 Hz. In the present exemplary embodiment, the natural frequency is provided to be 55 Hz. A natural frequency is, e.g., the smallest mechanical resonant frequency of the system made up of U-shaped springs 11, 12, 13, 14 and touch screen 16.

Touch screen 16 and display 17 according to FIG. 2 and FIG. 3 are connected in terms of data technology to an internal control system 20 by which a signal A including information to be displayed on display 17 is transmitted to display 17. From touch screen 16, internal control system 20 receives a signal P that indicates where a user of touch screen 16 is touching touch screen 16 and/or, if provided, whether the user is pressing on a position marked as input position on touch screen 16 such that it is to be understood as an input. It may be provided, for example, that an input is effected by simple touching of touch screen 16. However, provision may also be made that an input is not effected by simple touching of touch screen 16, but rather by (lightly) pressing on touch screen 16. The latter is a procedure that may be particularly suited for use in motor vehicles.

If touch screen 16 is touched or if touch screen 16 is pressed on, this information P is detected by an internal control system, the location being detectable, from information P, as to where touch screen 16 is touched or where the touch screen is pressed upon.

As confirmation of the input of a command, the control system generates a control signal S, which lasts at least 50 ms and by which actuator 18 is moved briefly. A command is able to be entered at previously specified and configured locations of the operating surface. The form of output control signal S may also be configured. The individual components of the operating device are dimensioned such that touch screen 16 is deflected by less than 1 mm, in this context. Control signal S may be, for instance, a simple step function or a control signal for generating a more complex motion as, for example, a decaying vibration. In such a particularly decaying vibration, the deflection of touch screen 16 takes place, e.g., for a time period between 50 ms and 800 ms, e.g., for a time period between 100 ms and 400 ms.

The haptic mechanism according to the exemplary embodiment illustrated in FIG. 2 and FIG. 3 may be particularly suitable for use in motor vehicles. However, it should be understood that example embodiments of the present invention are not limited to such a configuration. There may, for instance, be other motions provided, such as a vertical deflection, for example, by an actuator that moves the touch screen, or by a transparent actuator layer situated on the touch screen, such as a sol-gel. The documents mentioned above also, in part, describe usable driving motions for generating a haptic feedback.

Display 17 may be able to be activated, using internal control system 20, via a display signal A, so that the image composition takes place on display 17 using internal control system 20.

Figure 4:
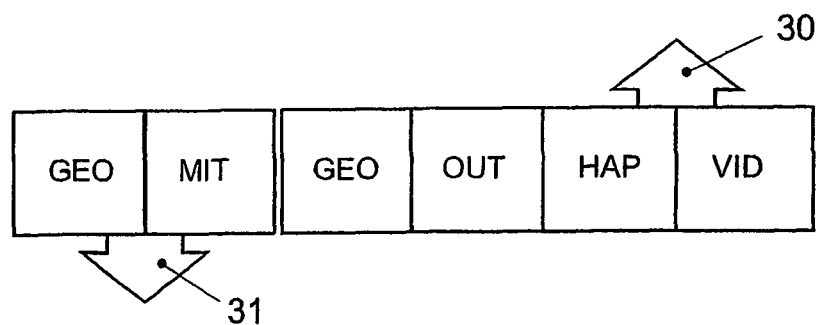
FIG. 4 illustrates an exemplary embodiment of an interface.

Operating device 3 includes an interface 10 via which an information exchange takes place that is illustrated schematically in FIG. 4, the information assigned to arrow 30 designating information able to be read in by operating device 3, and the information assigned to arrow 31 designating information able to be output by operating device 3. The information able to be read in by operating device 3 may include, e.g.: geographical details GEO for specifying a point and/or an area on touch screen 16; an output instruction OUT assigned to geographical details GEO as to whether, in response to a touching of touch screen 16 and/or in response to a pressing on touch screen 16 at a location on touch screen 16 that corresponds to the geographical details GEO, a message MIT is to be output concerning the touching of touch screen 16 and/or the pressing on touch screen 16 by operating device 3; (optionally) a haptic indication HAP, assigned to geographical details GEO, for indicating the type of the haptic reaction in response to a touching of touch screen 16 and/or in response to a pressing on touch screen 16; and an image signal VID, assigned to geographical details GEO for displaying on display 17.

Image signal VID and haptic control signal S are also able to be represented with the aid of different control units. For example, the image signal output and the input unit may also be physically separated.

The information that is able to be output by operating device 3 includes message MIT concerning the touching of touch screen 16 and/or the pressing on the touch screen 16, and possibly corresponding geographical details GEO as to where the touching of touch screen 16 and/or the pressing on touch screen 16 takes place.

Figure 5:
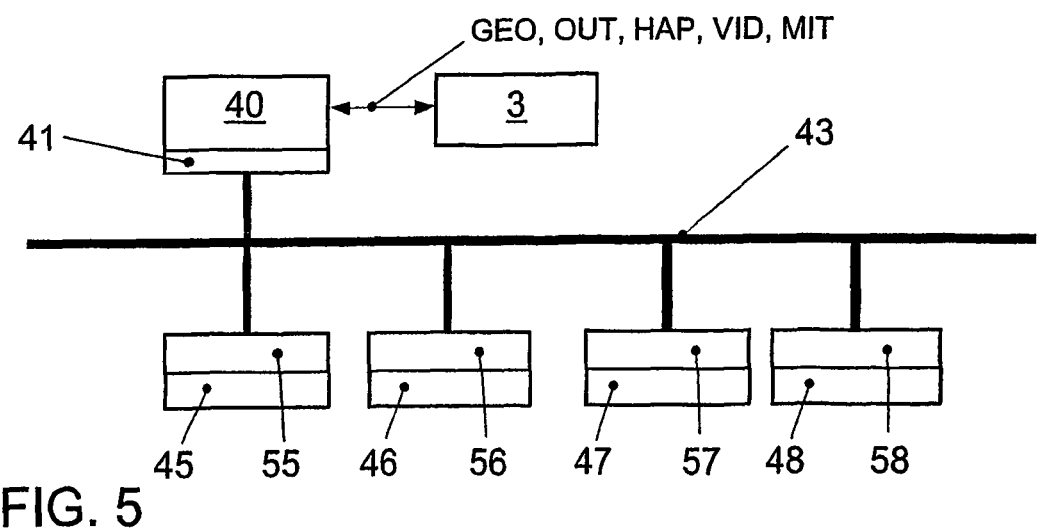
FIG. 5 illustrates an exemplary embodiment for the integration of an operating device in a motor vehicle.

With the aid of operating device 3, as illustrated in FIG. 5, an air conditioning system 45 of motor vehicle 1, a navigation system 46 of motor vehicle 1, an infotainment system 47 of motor vehicle 1 and/or a telephone 48 in motor vehicle 1 are operable. To do this, operating device 3 is connected to a display control unit 40 (via interface 10), which is connected via an interface 41 and via a bus system 43, in terms of data technology, to air conditioning system 45, or rather, a control system 55 that is assigned to air conditioning system 45, to navigation system 46, or rather, a control system 56 that is assigned to navigation system 46, to infotainment system 47, or rather, a control system 57 that is assigned to infotainment system 47 and/or to telephone 48, or rather, a control system 58 that is assigned to telephone 48. Via interface 40, communication is able to be carried out with the aid of a protocol, which includes an operation field for identifying a task to be carried out using the information concerning the operation of the motor vehicle, a data field having a value for the information concerning the operation of the motor vehicle and an ID field for identifying the information concerning the operation of the motor vehicle.

Figure 6:
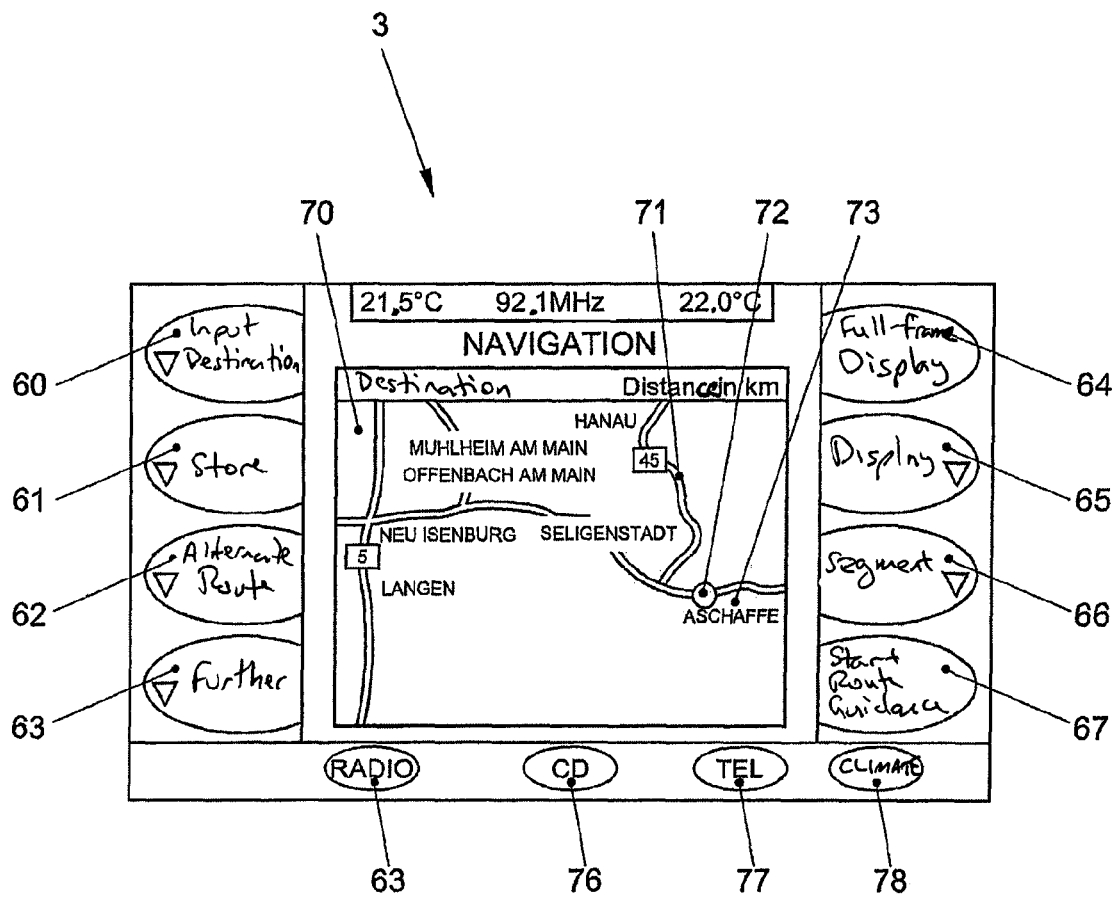
FIG. 6 illustrates an exemplary embodiment for the operation of a navigation system using an operating device illustrated in FIG. 2, FIG. 3 and FIG. 5.

As illustrated in FIG. 6, using operating device 3 and using navigation system 46 as an example, operating elements 60, 61, 62, 63, 64, 65, 66, 67, 75, 76, 77, 78 are able to be acted upon for operating air conditioning system 45, navigation system 46, infotainment system 47 and telephone 48. Navigation system 46 is able to be operated by pressing on operating elements 60, 61, 62, 63, 64, 65, 66, 67. When one presses on one of operating elements 60, 61, 62, 63, 64, 65, 66, 67, internal control system 20 generates a haptic feedback which makes it possible for an operator who has pressed on one of operating elements 60, 61, 62, 63, 64, 65, 66, 67, to detect whether the operation of operating element 60, 61, 62, 63, 64, 65, 66 or 67 has indeed taken place. In addition, internal control system 20 transmits the information to display control 40 as to which operating element 60, 61, 62, 63, 64, 65, 66 or 67 is pressed. If operating element 62 is pressed, for example, display control 40 transmits to internal control system 20 a secondary menu for inputting an alternate route and the position of the operating elements provided in it. When all details for an alternate route have been input by operating device 3, display control 40 transmits these details to navigation system 46, which computes the appropriate alternate route.

By pressing on operating element 75, one is able to call up a secondary menu for operating a radio assigned to infotainment system 47; by pressing on operating element 76, one is able to call up a secondary menu for operating a CD changer assigned to infotainment system 47; by pressing on operating element 77, one is able to call up a secondary menu for operating telephone 48 and by pressing on operating element 78, one is able to call up a secondary menu for operating air conditioning system 45.

It may be provided that actuator 18, controlled by internal control system 20, vibrates in response to the touching of operating elements 60, 61, 62, 63, 64, 65, 66, 67, 75, 76, 77, 78 such that, to an operator, it feels as if operating elements 60, 61, 62, 63, 64, 65, 66, 67, 75, 76, 77, 78 project relief-like above other areas of touch screen 16. Information on these different haptic feedbacks is transmitted to internal control system 20 as haptic details HAP. It may also be provided that, in response to the operation of operating elements 60, 61, 62, 63, 64, 65, 66, 67, a different haptic feedback is generated than in response to the operation of operating elements 75, 76, 77, 78. Information concerning these different haptic feedbacks are also transmitted to internal control system 20 as haptic details HAP.

In FIG. 6, using operating device 3, there is also illustrated a map 70 having roads 71, districts 72 for showing localities as well as corresponding place names 73. It may be provided that actuator 18, controlled by internal control system 20, vibrates in response to touching roads 71 and/or district 72 such that it feels to an operator as if roads 71 and/or districts 72 extended relief-like above other areas of touch screen 16. Information on these different haptic feedbacks are also transmitted to internal control system 20 as haptic details HAP.

Besides the forcefulness of the haptic feedback, its type, duration and/or triggering point in time may also be arranged differently and be transmitted as haptic details HAP.

It may be provided that information such as geographic details GEO, haptic details HAP and output instructions OUT are stored in operating device 3 and are assigned to an identity parameter, e.g., for a secondary menu. In this instance, it is provided that this identity parameter is read in via interface 30. Such a transmission of an identity parameter, which relates to a stored assignment of geographic details GEO and an output instruction OUT as well as, optionally, haptic details HAP, may be similar to the transmission of geographic details GEO and an assigned output instruction OUT as well as, optionally, assigned haptic details HAP.

LIST OF REFERENCE CHARACTERS 1 motor vehicle
2 center console
3 operating device
4 steering wheel
10, 41 interface
11, 12, 13, 14 spring
15 frame
15A, 15B, 15C, 15D connecting element
16 touch screen
16A operating surface
17 display
18 actuator
18A drive shaft neck
19 connector
19A curved region
20 internal control system
21 reference element
25, 27 spring arm
26 connecting point
28 opening
29A, 29B, 29C, 29D holding device
30, 31 arrow
40 display control unit
43 bus system
45 air conditioning system
46 navigation system
47 infotainment system
48 telephone
55, 56, 57, 58 control system
60, 61, 62, 63,
64, 65, 66, 67
75, 76, 77, 78 operating element
70 map
71 road
72 district
73 locality
A, P signal
GEO geographic details
HAP haptic details
HR main direction
MIT message on touching of the touch screen and/or pressing on the touch screen
NR secondary direction
OUT output instruction
S control signal
VID image signal

What is claimed is:

1. An operating device for operating a computing device in a motor vehicle, comprising:
    a display configured to optically display information;
    a touch screen arranged above the display configured to input commands based on a pressure exerted on the touch screen, as ascertained by a force sensor, and based on a location on the touch screen where the pressure is exerted;
    an actuator configured to set the touch screen in motion;
    at least one spring element operatively arranged between the actuator and an outer periphery of the touch screen to transfer motion from the actuator to the touch screen; and
    an internal control system configured to control the actuator to set in motion the touch screen in response to a pressure exerted on the touch screen in an area of the touch screen provided for haptic feedback; and
    an interface configured to read in at least one of:
    (a) geographical details to specify at least one of (a) a point and (b) an area on the touch screen; and
    (b) an output instruction assigned to the geographical details to state whether, in response to a pressure exerted on the touch screen at a location on the touch screen that corresponds to the geographical details, a message is to be output by the operating device relating to the pressure exerted on the touch screen;
    wherein the interface is configured to transmit, to the operating device, a haptic indication, assigned to the geographical details, to indicate a type of the haptic reaction in response to the pressure exerted on the touch screen.

2. The operating device according to claim 1, wherein the operating device is adapted to operate a computing device to control functions in the motor vehicle.

3. The operating device according to claim 1, wherein the internal control system is configured to control the actuator in different manners for generating different haptic feedbacks.

4. The operating device according to claim 1, wherein the interface is configured to output a message, assigned to the geographical details, relating to the pressure exerted on the touch screen.

5. A motor vehicle, comprising:
an operating device configured to operate a computation device, the operating device including:
a display configured to optically display information;
a touch screen arranged above the display configured to input commands based on a pressure exerted on the touch screen, as ascertained by a force sensor, and based on a location on the touch screen where the pressure is exerted;
an actuator configured to set the touch screen in motion;
at least one spring element operatively arranged between the actuator and an outer periphery of the touch screen to transfer motion from the actuator to the touch screen; and
an internal control system configured to control the actuator to set in motion the touch screen in response to a pressure exerted on the touch screen in an area of the touch screen provided for haptic feedback; and
an interface configured to read in at least one of:
(a) geographical details to specify at least one of (a) a point and (b) an area on the touch screen; and
(b) an output instruction assigned to the geographical details to state whether, in response to a pressure exerted on the touch screen at a location on the touch screen that corresponds to the geographical details, a message is to be output by the operating device relating to the pressure exerted on the touch screen;
wherein the interface is configured to transmit, to the operating device, a haptic indication, assigned to the geographical details, to indicate a type of the haptic reaction in response to the pressure exerted on the touch screen.

6. The motor vehicle according to claim 5, wherein the computation device includes at least one of (a) a control system configured to control an air conditioning system of the motor vehicle, (b) a control system configured to control a navigation system of the motor vehicle, (c) a control system configured to control an infotainment system of the motor vehicle, (d) a control system configured to control a telephone in the motor vehicle and (e) a control system configured to control another component.

7. The motor vehicle according to claim 5, wherein the operating device is configured to operate at least one of (a) an air conditioning system of the motor vehicle, (b) a navigation system of the motor vehicle, (c) an infotainment system of the motor vehicle and (d) a telephone in the motor vehicle.

8. An operating device for a motor vehicle, comprising:
a display configured to optically display information;
a touch screen arranged above the display configured to input commands based on a pressure exerted on the touch screen, as ascertained by a force sensor, and based on a location on the touch screen where the pressure is exerted;
an actuator configured to set the touch screen in motion;
at least one spring element operatively arranged between the actuator and an outer periphery of the touch screen to transfer motion from the actuator to the touch screen; and
an interface configured to read in at least one of:
(a) geographical details configured to specify at least one of (a) a point and (b) an area on the touch screen; and
(b) an output instruction assigned to the geographical details to state whether, in response to a pressure exerted on the touch screen at a location on the touch screen that corresponds to the geographical details, a message is to be output by the operating device relating to the pressure exerted on the touch screen;
wherein the interface is configured to transmit, to the operating device, a haptic indication, assigned to the geographical details, to indicate a type of the haptic reaction in response to the pressure exerted on the touch screen.

9. The operating device according to claim 8, wherein the interface is configured to output a message, assigned to the geographical details, relating to the pressure exerted on the touch screen.

10. The operating device according to claim 1, wherein the at least one spring element includes at least one U-shaped spring element arranged around the outer periphery of the touch screen.

11. The operating device according to claim 10, wherein the at least one U-shaped spring element includes two spring arms configured to define a main spring constant in a plane of the touch screen and a secondary spring constant orthogonal to the main spring constant in the plane of the touch screen.

12. The operating device according to claim 11, wherein the secondary spring constant is at least four times the main spring constant.

13. The operating device according to claim 1, wherein the touch screen and the at least one spring element are configured to define a mechanical natural frequency of between 5 Hz and 150 Hz.

* * * * *